Aug. 23, 1960  D. F. FROELICH ET AL  2,949,964
AIRPLANE PROPELLER SPINNER ATTACHMENT DEVICE
Filed Aug. 15, 1957  2 Sheets-Sheet 1
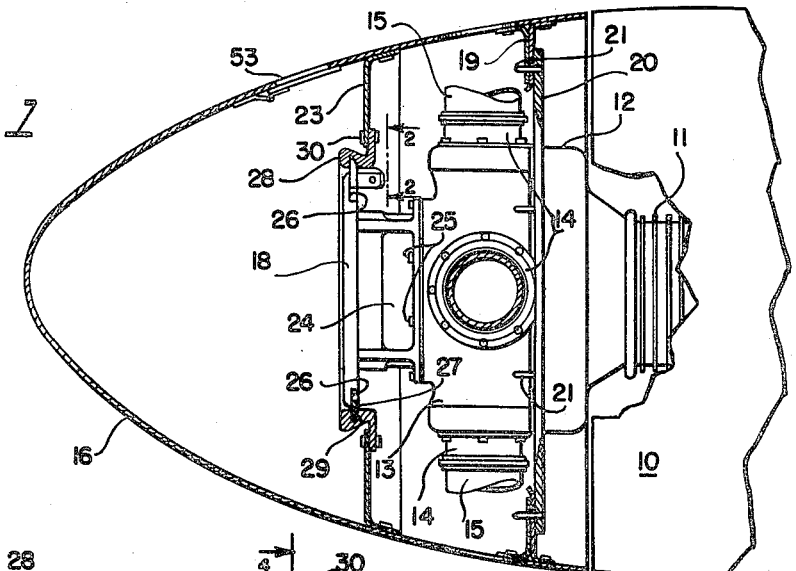
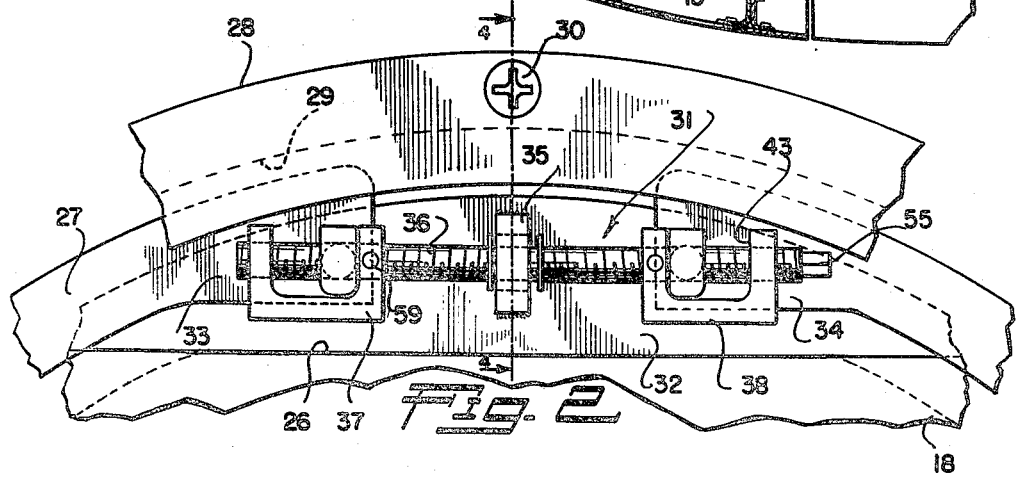
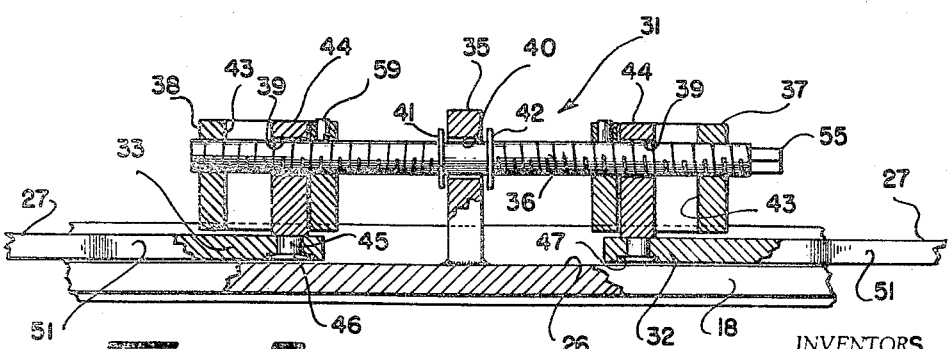
INVENTORS
DONALD F. FROELICH
EDWARD B. WAGNER
By George Sullivan
Agent Aug. 23, 1960 D. F. FROELICH ET AL 2,949,964
AIRPLANE PROPELLER SPINNER ATTACHMENT DEVICE
Filed Aug. 15, 1957 2 Sheets-Sheet 2
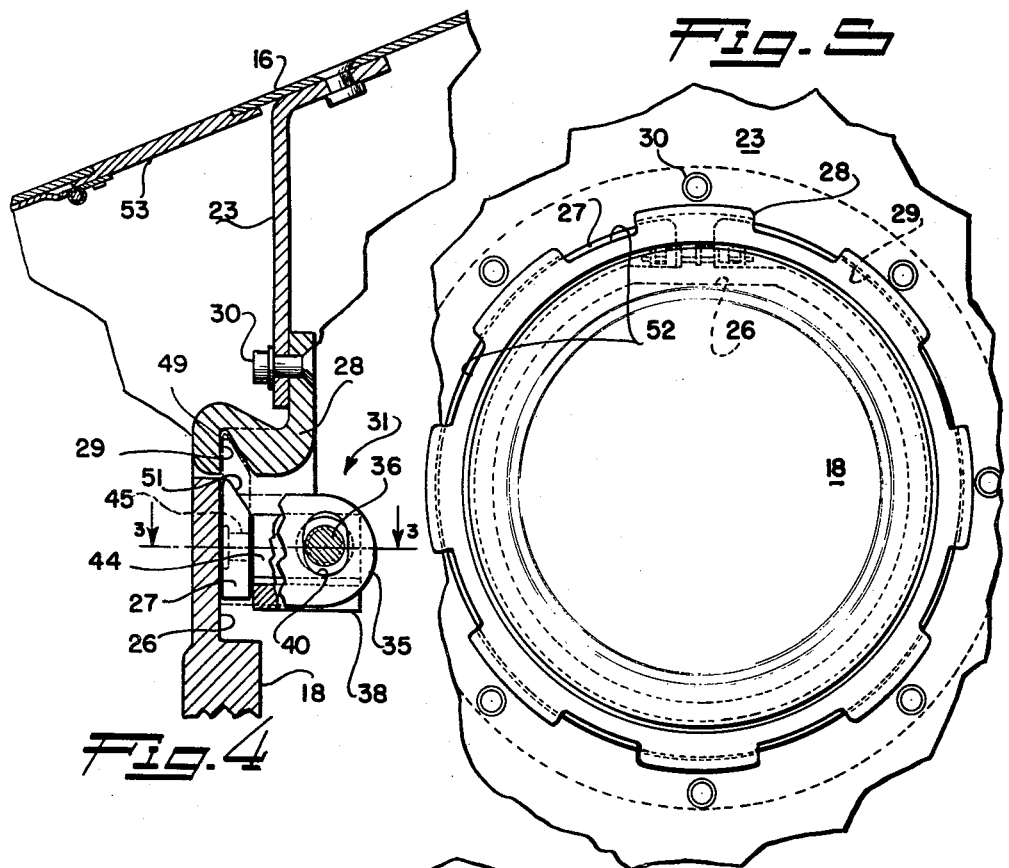
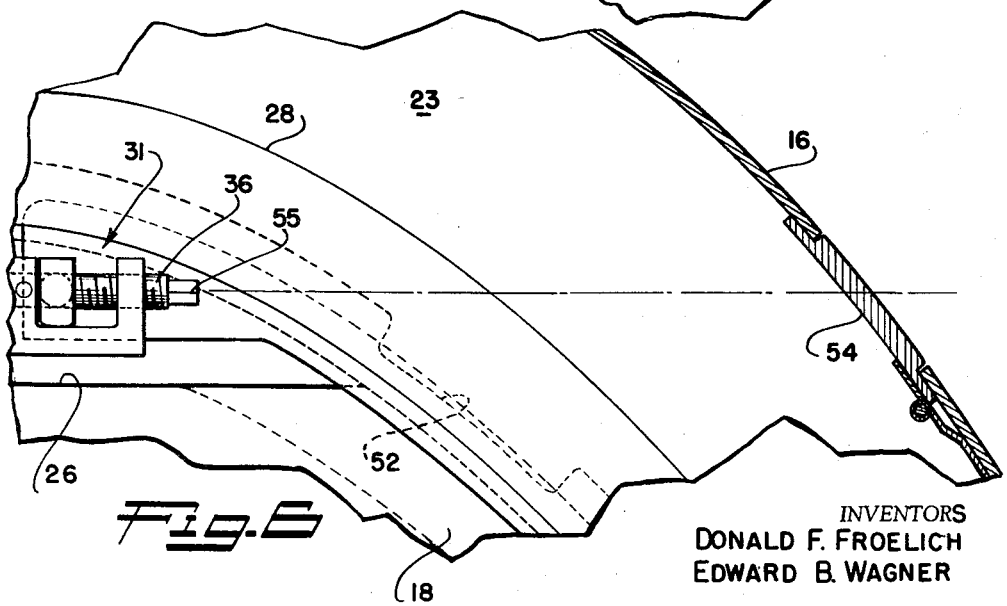
INVENTORS
DONALD F. FROELICH
EDWARD B. WAGNER
By *George A. Sullivan*
Agent United States Patent Office 2,949,964
Patented Aug. 23, 1960

2,949,964

AIRPLANE PROPELLER SPINNER ATTACHMENT DEVICE

Donald F. Froelich, Van Nuys, and Edward B. Wagner, Tujunga, Calif., assignors to Lockheed Aircraft Corporation, Burbank, Calif.

Filed Aug. 15, 1957, Ser. No. 678,383

1 Claim. (Cl. 170—159)

This invention relates to aircraft propellers and more particularly to attachment means for securing a spinner onto the propeller.

In the aircraft industry, it has been the conventional practice to mount a propeller spinner onto the propeller hub by means of a plurality of bolts which when secured are retained in place by means of lockwire. Generally, two mechanics are required to initiate spinner installation onto a propeller and a great deal of time is usually spent in properly locating the bolts and installing the lockwire.

Difficulties have been encountered when following the above conventional practice for spinner installation which are partially due to the fact that many of the parts, such as bolts, washers, etc., are not held in captivity during assembly or disassembly and therefore these parts are lost or damaged by the mechanics. Furthermore, when a plurality of bolts is used, there naturally arises an alignment problem.

Therefore, it is an object of the present invention to provide a novel propeller spinner attachment means which employs a single bolt installation and in which all parts are held captive during either assembly or disassembly.

It is another object of the present invention to provide a novel propeller spinner attachment means which provides continuous peripheral bearing on the spinner at the attachment plane.

It is another object of the present invention to provide a spinner attachment means which provides initial installation retainment and which is suitable for final tightening upon visual inspection.

Another object is to provide a "fail safe" propeller spinner attachment means which increases its retaining power when subjected to centrifugal forces.

Still another object of the present invention is to provide a novel propeller spinner attachment means which is favorable to spinner interchangeability during routine aircraft servicing and maintenance operations.

Further and other objects of this invention will be readily apparent from the description of the accompanying drawings which form a part of this disclosure and wherein like numerals refer to like parts.

In the drawings:

Figure 1 is a side view, in elevation, of a propeller spinner installation in accordance with the present invention;

Figure 2 is an enlarged view of the retainer mechanism employed in the spinner installation of Figure 1, taken in the direction of arrows 2—2;

Figure 3 is a plan view, partly in section, of the retainer mechanism shown in Figure 2;

Figure 4 is an elevational view, in section, of the retainer mechanism shown in Figure 2 taken in the direction of arrows 4—4;

Figure 5 is an enlarged front view of the propeller spinner installation shown in Figure 1; and Figure 6 is a fragmentary view of the retainer mechanism showing its being readily accessible from the exterior of the spinner shell via a flap cover.

With reference to Figure 1, the forward end of a nacelle 10 of an airplane is shown through which is mounted a propeller assembly comprising a regulator assembly 11 carried on a rotatable shaft (not shown), a housing 12 and a propeller hub 13. Hub 13 includes a plurality of blades sockets 14, each of which has journaled therein a blade 15 for pitch changing rotation. In the present illustration, hub 13 is suitable for carrying four blades. Housing the hub and secured thereto is a streamlined spinner 16. Spinner 16 is carried by a front baffle plate 18 and an aft baffle plate 20. Aft plate 20 is carried by housing 12 and is of greater diameter than the housing so that its periphery projects outwardly about the propeller shaft. The periphery of plate 20 is provided with a plurality of guide pins 21 suitably mounted thereon which point forward of the aft baffle plate. The interior of spinner 16 is provided with an annular ring 19 riveted to the spinner which is provided with a plurality of apertures adaptable to receive the guide pins on aft baffle plate 20. The tips of the guide pins are preferably tapered and are of less diameter than the holes carried in annular support 19 so that the holes may be readily aligned with the guide pins.

Spinner 16 is carried on forward baffle plate 18 by means of an annular support 23 which is riveted onto the spinner and is attached to plate 18 by the arrangement of the present invention to be described with reference to later figures. Forward baffle plate 18 may take the form of an outwardly radiating flange formed about a collar 24 of smaller diameter which is suitably secured to the propeller hub 13 by means of a plurality of bolts, such as bolt 25. The outer periphery of forward baffle plate 18 is arranged with a rearward facing notch 26 adaptable to carry an expandable retaining spring 27. Annular support 23 is employed to carry an annular receptacle 28 having a continuous groove 29 which is arranged to receive the outer periphery of the retaining ring 27 in order to hold spinner 16 onto the propeller hub 13. Support 23 is connected to receptacle 28 by a plurality of fasteners 30.

In reference to Figures 2, 3, and 4, retaining mechanism 31 is disposed within an enlarged portion 32 of the notch 26 which adjustable closes an area between the two free ends 33 and 34 of the expandable ring 27. This mechanism comprises a support post 35 for rotatably carrying a threaded bolt 36 having a pair of movable carriages 37 and 38 adapted to travel on the bolt threads toward the post upon rotation of the bolt in one direction and away from the post upon bolt rotation in an opposite direction. Bolt 36 is prevented from traveling out of bore 40 of the post by means of a pair of guides 41 and 42. The carriages are provided with fiber inserts 59 which bear into the threads of the bolt to provide a tight fit so that ordinary vibration will not easily cause the carriages to ride on the bolt.

Each carriage is provided with a cut-out portion 43 which contains a ring post 44 which is carried by an end of the retaining ring in a swivel fashion by means of a foot 45 having a flange 46 which has been upset in a recess 47. Each post 44 is provided with an enlarged hole 39 through which bolt 36 passes without engagement therewith. During rotation of bolt 36, the bolt is free to travel through hole 39 of each post and only the carriage moves. Inasmuch as post 44 may be movable within the cut-out 43 and since the carriages are held in threadable engagement with bolt 36, the carriages will ride on the bolt until post 44 is engaged by the walls defining the cut-out. The movement of carriages 37 and 38 then determines the direction of travel of the posts in accordance with the rotation of bolt 36. Thereby the ring 27 may be expanded or contracted by rotating bolt 36.

As shown in Figure 4, ring 27 is provided with an annular flat surface 51 forming a toe about the periphery of the ring. This toe is provided to form a snug fit with groove 29 of receptacle 28 when the ring has been fully expanded as shown in broken lines. Surface 51 mates with an angular surface 49 within groove 29 so that the spinner may be drawn rearward upon the expansion of ring 27.

With reference to Figure 5, receptacle 28 is shown with a plurality of recesses, such as recess 52, which serves to expose ring 27 upon its proper seating within groove 29. The provision of such recesses makes possible the visual inspection by a mechanic to determine if the ring 27 has been properly seated or if the ring has been broken. A mechanic has access for this visual inspection by means of a conventional flap door 53 provided in the shell of the spinner as shown in Figure 4.

In reference to Figure 6, an additional flap door 54 is shown which opens interiorly of the spinner in order to make bolt 36 accessible from the exterior of the spinner. Bolt 36 may be provided with any suitable configuration on its end 55, such as the square shown, to which a tool may be suitably detachably connected for rotation of the bolt.

In actual operation, retaining ring 27 is compressed by means of the retaining mechanism 31 by rotating bolt 36 in a direction which will cause carriages 37 and 38 to travel towards center support post 35. This direction of carriage travel, causes posts 44 carried on each end of the ring 27 to engage with walls defining the cut-out 43 of each carriage so that the two ends 33 and 34 of the ring are urged together. Inasmuch as posts 44 are mounted in a swivel fashion on the ends of the ring, no binding will occur between bolt 36 and holes 39 provided in each of the posts 44 as ends 33 and 34 travel toward each other on a slight curvilinear course.

When retaining ring 27 has been compressed below the periphery of front baffle plate 18 with notch 26, spinner 16 may be mounted over the propeller hub 13 so that apertures provided in annular structure 19 may receive the tapered guide pins 21 carried by aft baffle plate 20. Proper alignment of the guide pins with the apertures provided on annular support 19 places retaining ring 27 in a position to be expanded into a groove 29 formed in receptacle 28. The expansion of ring 27 is accomplished by inserting a wrench through flap door 54 into engagement with end 55 of bolt 36. Bolt 36 is rotated in a direction which causes carriage 37 and 38 to travel outward on bolt 36 away from center support post 35. Inasmuch as posts 44 are carried within the cut-out 43 of each carriage, the posts are carried outwardly by means of the carriage travel which forcibly expands the ring.

As ring 27 expands, its surface 51 engages with surface 49 of groove 29 and spinner 16 is urged rearward since front baffle plate 18 is secured to the propeller hub. This rearward urging of spinner 16 by the mating of angular surfaces completes the rearward travel of spinner 16 on guide pins 21 and bolt 36 may be rotated to expand ring 27 into firm engagement with groove 29. The mechanic may now remove the wrench from end 55 of bolt 36 and door 54 will automatically close by means of its spring.

Upon rotation of the propeller shaft, ring 27 will be urged to expand outwardly because of the centrifugal force produced by rotating the propeller shaft at high speed.

Having described only typical forms of the invention we do not wish to be limited to the specific details herein set forth, but wish to reserve to ourselves any variations or modifications that may appear to those skilled in the art and fall within the scope of the following claim.

We claim:

In a propeller, the combination comprising, a hub secured to the propeller, blades extending substantially radially from the hub, a generally conical spinner enclosing the hub, first and second inwardly extending annular flanges secured to the spinner, the first and second flanges being spaced apart and separated by the hub, front and rear baffle plates attached to opposite sides of the hub in a parallel relationship, the front baffle plate having an annular notch about its rearward periphery, a split resilient ring carried within the annular notch; expandable means operatively carried on the ring for urging the ring into engagement with the first annular flange comprising, a post carried within the notch between the opposing ends of the ring, a swivel post rotatably carried on each end of the ring, a bolt carried within the center post rotatable therein, and a pair of carriages in threadable engagement with opposite ends of the bolt having a cut-out portion for receiving the post associated with each end of the ring; and guiding means carried by the rear baffle plate engaging with the second annular flange to align the spinner on the rear baffle plate with respect to the hub and propeller.

References Cited in the file of this patent

UNITED STATES PATENTS

| | | |
|---|---|---|
| 485,484 | Arnold | Nov. 1, 1892 |
| 1,140,535 | Schroeder | May 25, 1915 |
| 2,297,226 | Muller-Keuth | Sept. 29, 1942 |
| 2,336,256 | Junger | Dec. 7, 1943 |
| 2,595,787 | Heimann | May 6, 1952 |